No. 879,440. PATENTED FEB. 18, 1908.
B. E. CAROTHERS.
COLANDER.
APPLICATION FILED APR. 27, 1906.
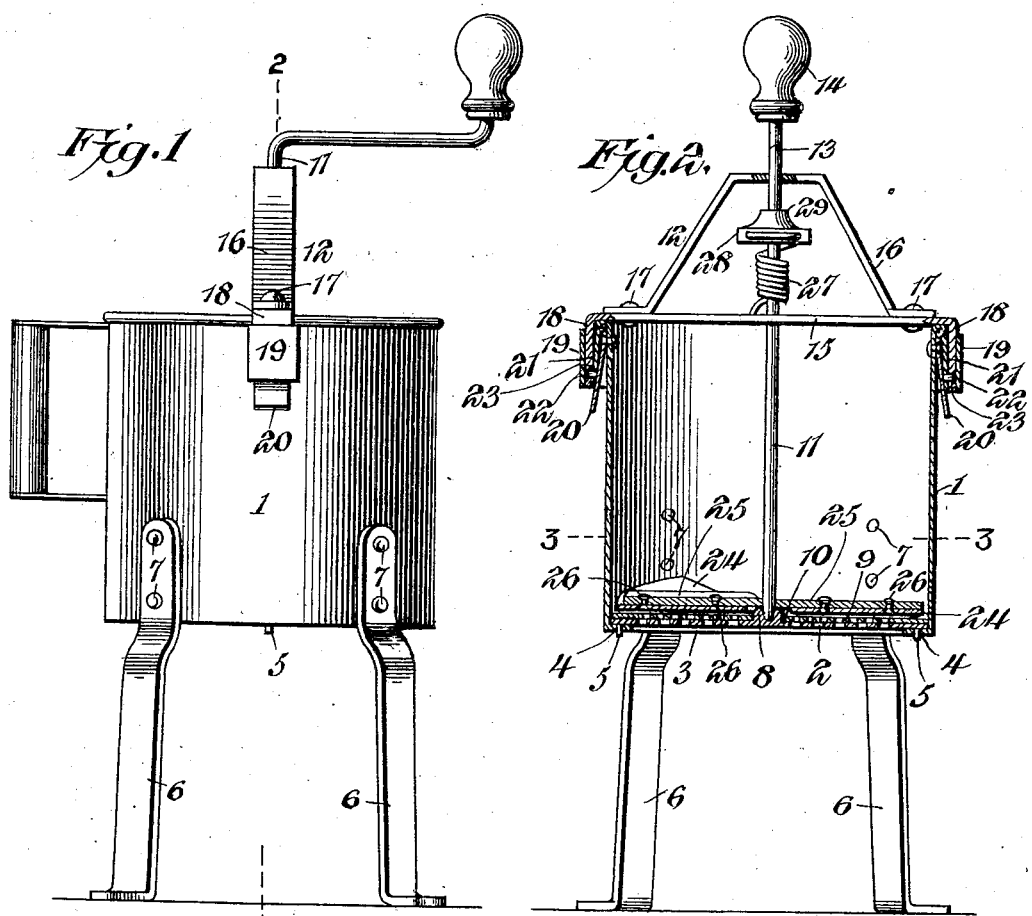
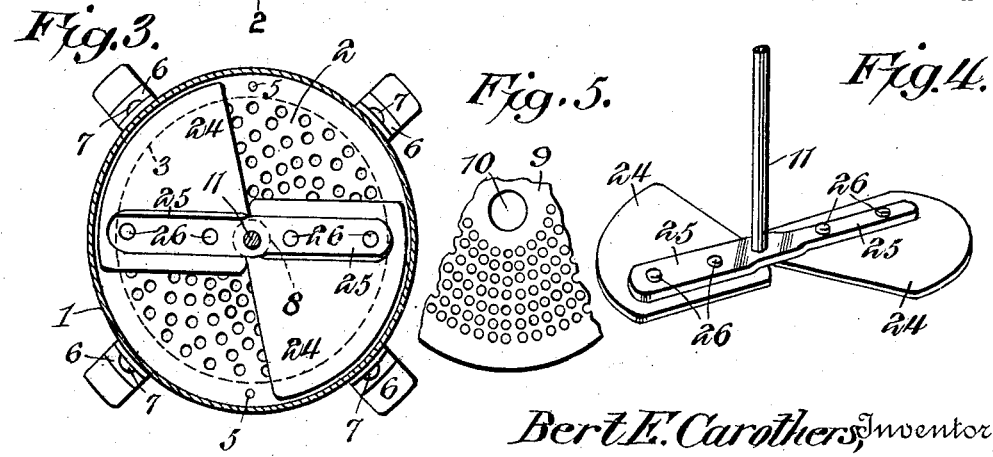
Bert E. Carothers, Inventor,
Witnesses

UNITED STATES PATENT OFFICE.

BERT EMERSON CAROTHERS, OF MILAN, MISSOURI.

COLANDER.

No. 879,440.  Specification of Letters Patent.  Patented Feb. 18, 1908.

Application filed April 27, 1906. Serial No. 314,014.

*To all whom it may concern:*

Be it known that I, BERT EMERSON CAROTHERS, a citizen of the United States, residing at Milan, in the county of Sullivan and State of Missouri, have invented a new and useful Colander, of which the following is a specification.

The invention relates to improvements in colanders.

The object of the present invention is to improve the construction of colanders, and to provide a simple, inexpensive and efficient device designed for separating the juice and pulp of fruit from the skin, seeds, stone, etc., and capable of being easily and rapidly operated and of being readily cleaned after the straining operation is completed.

With these and other objects in view, the invention consists in the construction and novel combination of parts hereinafter fully described, illustrated in the accompanying drawing and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is an elevation of a colander constructed in accordance with this invention. Fig. 2 is a vertical sectional view of the same taken substantially on the line 2—2 of Fig. 1. Fig. 3 is a horizontal sectional view on the line 3—3 of Fig. 2. Fig. 4 is a detail perspective view of the blades. Fig. 5 is a detail view of a portion of one of the perforated disks.

Like numerals of reference designate corresponding parts throughout the several figures of the drawings.

1 designates a cylindrical receptacle, having a perforated bottom 2 consisting of a removable disk or plate, which is supported by a horizontal flange 3, extending inwardly from the lower edge of the body of the receptacle. The inwardly extending flange is provided at opposite points with perforations 4 for the reception of studs or projections 5 of the bottom disk or plate 2, whereby the latter is detachably interlocked with the body of the receptacle and is held against rotary movement within the same.

The receptacle is provided with legs 6, having their lower ends out-turned to form feet and secured at their upper ends by rivets 7, or other suitable fastening devices, to the exterior of the body of the receptacle.

The removable disk or plate 2 is provided with a central bearing 8, and may have perforations of any desired size. The colander is designed to be equipped with a plurality of bottom plates having perforations of different sizes, and a plate 9, having fine perforations, may be placed upon the bottom plate 2 without removing the latter. The plate 9 is provided with a central opening 10 to enable it to be placed over the central bearing 8.

The bearing 8, which projects upwardly from the center of the bottom plate 2, has a recess or concavity and receives the lower end of a vertical shaft 11, which is journaled in suitable bearings of a bracket 12, and which has its upper portion bent to form a crank 13. The crank 13 is provided with a suitable grip or handle 14, and enables the shaft to be rotated for operating the colander.

The bracket 21 consists of a lower transverse bottom bar 15 and an arched piece or bar 16, which extends upwardly from the transverse bottom bar and which is secured at its ends by rivets 17, or other suitable fastening device to the same. The bars 15 and 16 are provided with central vertically alined bearing openings for the reception of the shaft 11. The terminals of the transverse bar 15 are bent downward to form depending arms 18, which fit in loops 19 and which are engaged by catches 20, whereby the bracket is locked on the receptacle. The loops, which are suitably secured to the exterior of the body of the receptacle at diametrically opposite points, are located at the upper edges of the receptacle and are provided with partitions 21, which divide the loops into inner and outer recesses or openings, and the outer recesses or openings receive the depending terminal arms of the bar 15, and the catches are mounted in the inner openings. The catches consist of springs, which are secured at their upper ends by rivets, or other suitable fastening devices, to the receptacle and which are provided at an intermediate point with projections 22. The projections 22 extend through perforations of the partition 21 and engage openings 23 of the terminal arms of the bar 15. The lower portions of the catches extend below the loops, and when the catches are in engagement with the terminal arms of the bar 15, they are arranged at an inclination to the perforated bottom, as clearly illustrated in Fig. 2 of the drawing, whereby the lower or depending portions of the catches are readily compressed against the receptacle to withdraw the projections 22 from the openings of the arms 18. When the catches are compressed the bearing bracket may be readily removed from the receptacle.

The juice and pulp are worked through the perforated bottom of the receptacle by means of a pair of substantially quadrant shaped blades 24, which are set at an angle or inclination and which are secured to a pair of lower arms 25, extending from opposite sides of the shaft and arranged at the lower end thereof. The arms 25 consist of a bar or piece rigidly secured to the shaft 11, and bent or twisted slightly in opposite directions to set them at substantially the same angle as the blades 24. The blades 24 are secured to the arms 25 by rivets 26, or other suitable fastening devices, and when the shaft is rotated the blades force the juice and pulp through the perforations of the bottom of the receptacle. Owing to the inclination of the blades, the pressure is gradually applied to the material by a coiled spring 27. The coiled spring, which is disposed on the shaft, is located in the open space between the arched bar 16 and the transverse bottom bar 15, the lower end of the spring being secured to the bar 15, and the upper end being attached to a head 28. The head 28, which loosely receives the shaft, engages a shoulder 29 of the same, and is provided with suitable perforations to receive the upper end of the spring. By this construction the shaft is adapted to rotate freely in the head. The spring yieldably maintains the lower end of the shaft in the bearing socket of the bottom, and permits the blades to rise or yield in passing over seeds, stones, or other hard substances.

After the operation of straining the fruit or other material, the shaft, the blades, and the perforated bottom may be readily removed to enable the device to be thoroughly cleaned.

Having thus fully described my invention, what I claim as new and desire to secure by Letters Patent, is:—

1. A device of the class described comprising a receptacle having a perforate bottom, a shaft provided with inclined blades for forcing the material through the said bottom, loops mounted on the receptacle, a bearing bracket receiving the shaft and having projecting portions extending into the loops, catches mounted within the loops and engaging the projecting portions of the bearing bracket, and a spring connected with the bearing bracket and with the shaft.

2. A device of the class described, comprising a receptacle, loops mounted on the receptacle and provided with separate openings, a bearing bracket having a transverse bar extending across the receptacle and provided with depending ends forming arms extending into one of the openings of each loop, catches mounted in the other openings of the loops and provided with means for engaging the said arms, and a shaft journaled in the bracket and carrying means for forcing material through the bottom of the receptacle.

In testimony, that I claim the foregoing as my own, I have hereto affixed my signature in the presence of two witnesses.

BERT EMERSON CAROTHERS.

Witnesses:
  HERBERT A. SCHOENE,
  GODFRED M. HEYDE.